United States Patent
Deetz

(10) Patent No.: US 9,724,894 B2
(45) Date of Patent: Aug. 8, 2017

(54) MAGNETIC RECEPTIVE EXTRUDED FILMS

(71) Applicant: Dayton J. Deetz, Mendon, MA (US)

(72) Inventor: Dayton J. Deetz, Mendon, MA (US)

(73) Assignee: Deetz Family, LLC, Mendon, MA (US)

( * ) Notice: Subject to any disclaimer, the term of this patent is extended or adjusted under 35 U.S.C. 154(b) by 503 days.

(21) Appl. No.: 13/740,968

(22) Filed: Jan. 14, 2013

(65) Prior Publication Data

US 2013/0130000 A1    May 23, 2013

Related U.S. Application Data

(63) Continuation-in-part of application No. 12/590,293, filed on Nov. 5, 2009, now abandoned.

(Continued)

(51) Int. Cl.
*B32B 9/04* (2006.01)
*B32B 27/20* (2006.01)
(Continued)

(52) U.S. Cl.
CPC .......... *B32B 9/043* (2013.01); *B29C 47/0019* (2013.01); *B29C 47/0021* (2013.01); *B29C 47/065* (2013.01); *B32B 27/08* (2013.01); *B32B 27/18* (2013.01); *B32B 27/20* (2013.01); *B32B 27/32* (2013.01); *B32B 27/36* (2013.01); *B41M 5/508* (2013.01); *H01F 1/26* (2013.01);
(Continued)

(58) Field of Classification Search
CPC ......... B32B 5/16; B32B 15/09; B32B 15/085; B32B 15/18; B32B 7/00; B32B 27/20; B32B 9/04; B32B 3/18
See application file for complete search history.

(56) References Cited

U.S. PATENT DOCUMENTS

| 4,117,193 A | 9/1978 | Tsuchiya et al. |
| 4,233,367 A | 11/1980 | Ticknor et al. |

(Continued)

FOREIGN PATENT DOCUMENTS

| CN | 1226201 A | 8/1999 |
| CN | 1266775 A | 9/2000 |

(Continued)

OTHER PUBLICATIONS

International Search Report and Written Opinion of the International Searching Authority Application No. PCT/US2014/011237 Completed: Nov. 10, 2014; Mailing Date: Dec. 1, 2014 8 pages.

*Primary Examiner* — Monica Huson
(74) *Attorney, Agent, or Firm* — St. Onge Steward Johnston & Reens, LLC

(57) ABSTRACT

The invention produces a magnetic receptive polymer film with properties that will adhere to magnets by incorporating magnetic receptive particles in the formulation of the extruded or casted film. Furthermore, by use of the co-extrusion technique, the invention produce a print media in the form of a multilayered polymer film including a magnetic receptive core layer for adhering the film to magnets, and one or more layers attached to either one or both sides of the core layer, wherein at least one outermost surface of the layers is absent or substantially absent of ferromagnetic material and suitable to accept printing.

8 Claims, 3 Drawing Sheets

Related U.S. Application Data

(60) Provisional application No. 61/198,524, filed on Nov. 6, 2008.

(51) Int. Cl.

| | |
|---|---|
| *B29C 47/00* | (2006.01) |
| *B29C 47/06* | (2006.01) |
| *B32B 27/18* | (2006.01) |
| *B32B 27/32* | (2006.01) |
| *H01F 1/26* | (2006.01) |
| *B32B 27/08* | (2006.01) |
| *B32B 27/36* | (2006.01) |
| *H01F 1/37* | (2006.01) |
| *H01F 41/16* | (2006.01) |
| *B41M 5/41* | (2006.01) |
| *B41M 5/42* | (2006.01) |
| *B41M 5/50* | (2006.01) |
| *B41M 5/52* | (2006.01) |

(52) U.S. Cl.
CPC ............... *H01F 1/37* (2013.01); *H01F 41/16* (2013.01); *B32B 2264/102* (2013.01); *B32B 2264/105* (2013.01); *B32B 2307/208* (2013.01); *B41M 5/41* (2013.01); *B41M 5/42* (2013.01); *B41M 5/504* (2013.01); *B41M 5/506* (2013.01); *B41M 5/52* (2013.01); *Y10T 428/24967* (2015.01); *Y10T 428/25* (2015.01); *Y10T 428/31786* (2015.04); *Y10T 428/31938* (2015.04); *Y10T 428/32* (2015.01)

(56) References Cited

U.S. PATENT DOCUMENTS

| | | | |
|---|---|---|---|
| 4,345,005 A | 8/1982 | All et al. | |
| 4,842,791 A | 6/1989 | Gould et al. | |
| 4,885,119 A | 12/1989 | Mueller et al. | |
| 5,036,210 A * | 7/1991 | Goodman | B29C 47/0019 138/104 |
| 5,389,422 A * | 2/1995 | Okazaki | B32B 27/20 428/141 |
| 5,422,175 A * | 6/1995 | Ito et al. | 428/304.4 |
| 5,426,011 A * | 6/1995 | Stephenson | B41M 5/48 101/485 |
| 5,573,897 A * | 11/1996 | Andries | G03C 1/74 427/131 |
| 5,945,205 A | 8/1999 | Keller et al. | |
| 6,054,028 A * | 4/2000 | Zingheim | H01B 7/0063 174/118 |
| 6,114,078 A | 9/2000 | Aylward et al. | |
| 6,194,058 B1 | 2/2001 | Isobe et al. | |
| 6,235,378 B1 | 5/2001 | Lowder | |
| 6,379,774 B1 * | 4/2002 | Tojo | C08J 7/047 428/141 |
| 6,387,485 B1 | 5/2002 | Bielek et al. | |
| 7,001,645 B1 * | 2/2006 | Texier | 427/547 |
| 7,338,573 B2 | 3/2008 | Boudouris et al. | |
| 2004/0009326 A1 | 1/2004 | Stefanutti et al. | |
| 2006/0147762 A1 | 7/2006 | Ono et al. | |
| 2007/0003727 A1 | 1/2007 | Fan Chiang et al. | |
| 2007/0037013 A1 | 2/2007 | Svensson et al. | |
| 2010/0127207 A1 | 5/2010 | Deetz | |
| 2013/0130000 A1 | 5/2013 | Deetz | |

FOREIGN PATENT DOCUMENTS

| | | |
|---|---|---|
| CN | 1836884 A | 9/2006 |
| EP | 0559484 A1 | 9/1993 |
| EP | 1597717 B1 | 11/2005 |
| JP | 2012507414 A | 3/2012 |
| WO | 2004075145 A1 | 9/2004 |
| WO | 2010053560 A1 | 5/2010 |
| WO | 2013000768 A1 | 1/2013 |

* cited by examiner

MAGNETIC RECEPTIVE EXTRUDED FILMS

FIELD OF THE INVENTION

This invention relates generally to multi-layered polymer print films and methods for producing the same.

BACKGROUND OF THE INVENTION

A print media product having magnetic receptive properties is typically prepared by applying a magnetic receptive coating to one-sided of a commercially extruded film after the extrusion process. This process, however, can only produce a product of one-sided printable surface. Retail graphics are always changing and the need for a product of double-sided printable surfaces is very real. Having the ability to reduce waste, lower shipping costs and mediate the need for installation is a game changer in the industry. Therefore, there exist a need for a simple process for producing a print media with magnetic receptive properties and a need for producing such print media with more than one-sided printable surface.

The processes of producing extruded single or multi-layer films are well known in the art. Commonly used processes include tubular blown film coextrusion, cast coextrusion, and water quench extrusion processes.

In many disclosed processes, numerous additions of both organic and inorganic media have been included in the master batch of polymers for extruded films. These have many commercial uses such as light blocking, increasing opacity and changing the post processing characteristics along with multiple other advantages. These additive approaches have been employed in the full range of media such as polypropylene, polyester, polyethylene and many other type and variations of synthetic films.

U.S. Pat. No. 5,945,205 discloses the use of fillers in the core layer ($1^{st}$ layer) for a light absorbing purpose to prevent spoilage of film-packaged food from UV degradation. In their process, they employ lamellar pigments such as graphite to enhance the voiding process and create an ultraviolet light block. This pigment is typically present in a 0.5% to 5% weight ratio. U.S. Pat. No. 4,345,005 discloses the use of additives to enhance adhesion of metalized coatings. Electron beam curing in a reactive setting, cures these coatings. This process is incapable of adding material that a magnet will adhere to. U.S. Pat. No. 4,117,193, teaches, that the inclusion of low-crystalline resin of an ethylene-butene copolymer and a polyolefin resin with a lubricant and an anti-blocking agent onto the surface produces a film that demonstrates low static properties and will aid in the prevention of blocking.

We have developed numerous magnetic receptive products from paints to papers and coated films. This product line allows us to produce a magnetic receptive print media in one co-extrusion process instead of a two-step process (which requires extruding a film followed by coating the film with a magnetic receptive media). In one aspect, this invention incorporates magnetic receptive particles into the formulation of a standard extruded film or a cast film so that the extruded film will adhere to magnets. In another aspect, the invention produce a print media in the form of a multilayered film comprising a magnetic receptive core layer for maintaining magnetic receptive properties, and one or more plastic layers attached to either one or both sides of the core layer, wherein the outermost surface(s) of the film is absent or substantially absent of ferromagnetic material and suitable to accept printing. The multilayered print film is conveniently produced by a co-extrusion technique.

SUMMARY OF THE INVENTION

This invention incorporates magnetic receptive media (e.g. ferromagnetic particles) in a conventional extrusion process to produce a magnetic receptive polymer core layer. Additionally, the invention provides a polymer print media with two-sided printable surfaces that will adhere to magnets in a co-extrusion process.

In one embodiment, the invention provides a cast or extruded polymer film comprising ferromagnetic particles suitable for adhering to magnets. In order to allow the polymer film to adhere to magnets and multilayered one on top of the other, higher than what is perceived as normal loads of magnetic receptive particles are used in the formulation. Magnetic receptive particles, such as iron, magnetite or other ferromagnetic particles, in the range of about 15% to about 70%, preferably about 30% to about 60% by weight of the film, can be used in the film formulation. The particle size of the magnetic receptive materials is preferred, but not limited to, from about 0.02 μm to about 44 μm. The film can be made of any polymers that can impart flexibility and stand the high temperature and pressure of an extrusion process without degradation. Preferably, the film is made of polyolefin, polypropylene, or other polymers suitable to be blended with the high load of magnetic receptive particles.

In another embodiment, the invention provides a co-extruded multilayered polymer film comprising a magnetic receptive core layer suitable to adhere to magnets as depicted in the previous embodiment, a first layer and a second layer which sandwich the core layer in between. Each of the inner surfaces of the first and second layers is adjacent to and fused with one side of the core layer. Both outer surfaces of the first and second layers are absent or substantially absent of ferromagnetic material and suitable to accept printing. The polymer suitable for making the first and second layers include any polymers that are flexible and can stand the high temperature and pressure of an extrusion process without degradation. Preferably, the polymer is chosen from the group consisting of polyolefin, polyester, polypropylene, and blends thereof. This embodiment provides a multilayered polymer film of one-sided or two-sided printable surfaces while maintaining the magnetic receptive properties of the film through a co-extrusion process without the need of using any adhesives in bonding the layers.

In yet another embodiment, the invention provides a co-extruded multilayered polymer film comprising a magnetic receptive core layer suitable to adhere to magnets as depicted in the previous embodiment, and a set of one or more layers. The set of one or more layers has an innermost surface and an outermost surface. The innermost surface is adjacent to and fused with one side of the core layer without use of adhesive in between. The outermost surface is absent or substantially absent of ferromagnetic material and suitable to accept printing. The set of one or more layers can made of the same polymers as that for the first or second layers of the previous embodiment. The set of one or more layers of this embodiment may incorporate other ingredients into the formulation for imparting other enhanced properties to the film. This embodiment provides a multilayered polymer film of one-sided printable surface while maintaining the magnetic receptive properties and possessing other enhanced properties through a co-extrusion process.

In a further embodiment, the invention provides a co-extruded multilayered polymer film comprising a magnetic receptive core layer suitable to adhere to magnets as depicted in the previous embodiment, and two sets of one or more layers which sandwich the core layer in between, as compared to one set of one or more layers of the previous embodiment. Each set of one or more layers has an innermost surface and an outermost surface, wherein the innermost surface of each set is adjacent to and fused with each of the two side of the core layer such that no adhesive is used in between. The outermost surface of each set is absent or substantially absent of ferromagnetic material and suitable to accept printing. This embodiment provides a multilayered polymer film of two-sided printable surfaces while maintaining the magnetic receptive properties and possessing various enhanced properties.

The present invention also provides a process for preparing the multilayered polymer print film. The process comprises the steps of: separately blending the feedstock for each layer, filling the blended feedstock of each layer into each designated slot of a single die of a extruder, heating the extruder to melt the blended feedstock, co-extruding the molten blended feedstock from each slot through a single die head onto a chill roll, upon which the layers of extrudates are melt together to create one film by the heat of the coextrusion and subsequently cooled to form a solid form. During the process, it is important to adjust the flow temperature of each layer so that the layers may cool at a substantially same rate. This is achieved by adding fillers to the formulations of the layers adjacent to the core layer because the high load of ferromagnetic particles significantly slows the cooling. The solid film can be subject to mono-axial or biaxial orientation after the co-extrusion to make the film thinner, more stable, and less likely to tear. Additionally, the solid film may be subject to corona treatment or print coating for better printability.

BRIEF DESCRIPTION OF THE DRAWINGS

This invention is illustrated in the drawings in FIGS. 1 through 3, which are all cross-sections of extruded polymer films.

DETAILED DESCRIPTION OF THE INVENTION

In one aspect, this invention advantageously provides a polymer print media that will adhere to magnets through one extrusion process, as compared to the two-step process in the art. In another aspect, this invention advantageously provides a magnetic receptive print media with two-sided printable surfaces through a coextrusion process, as compared to the print media with only one-sided printable surface available in the current print market.

Figure 2:
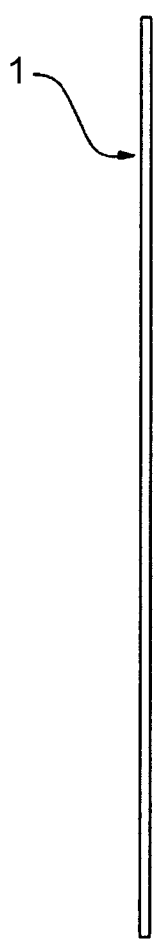
FIG. 2 depicts a single layered extruded polymer film comprising ferromagnetic particles (i.e., a magnetic receptive core layer 1).

The magnetic receptive properties of a polymer print media in accordance with the present invention are contributed to magnetic receptive particles incorporated in the formulation of an extruded or casted film. FIG. 2 depicts a single layered extruded polymer film comprising ferromagnetic particles (i.e., a magnetic receptive core layer 1) which is produced using a cast or extrusion process.

The core layer 1 may be made of flexible material such as plastic so that the film product may be rolled up into a roll. Additionally, the material used for the core layer 1 is, preferably, able to stand the high temperature and pressure of an extrusion process without degradation. For the ease of process, it is preferred to choose a polymer with the melting point between about 400° F. and about 600° F. to form the core layer 1. More preferably, the polymer is chosen from polyolefin, polypropylene, or blends thereof. Suitable magnetic receptive particles include, but are not limited to, iron, magnetite or other ferromagnetic particles, preferably 99% pure. To ensure the polymer film will adhere to magnets and multilayered one on top of the other, higher than what is perceived as normal loads of magnetic receptive particles are used in the formulation of the magnetic receptive core layer 1. In accordance with the present invention, the magnetic receptive particles comprise from about 15% to about 70%, preferably from about 30% to about 60% by weight of the film in the formulation. The particle size of the magnetic receptive materials is preferably, but not limited to, from about 0.02 μm to about 44 μm. In one embodiment, the core layer 1 is made of a composite with ferrous particles distributed within polyolefin resins. In another embodiment, the core layer 1 is made of a composite of polypropylene resins compounded with ferromagnetic particles.

Figure 1:
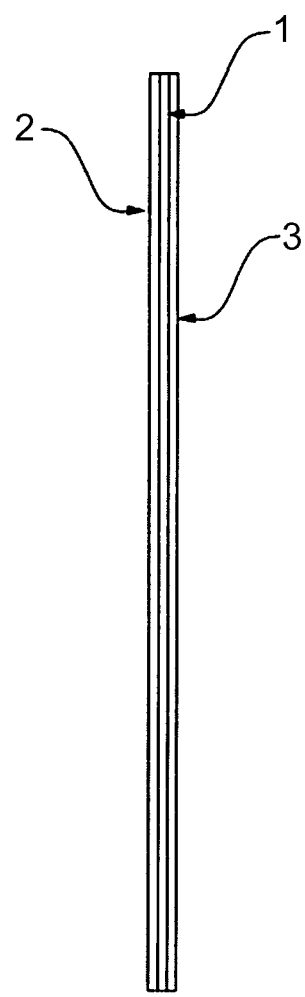
FIG. 1 depicts a three layered co-extruded polymer film wherein a core layer 1 comprises ferromagnetic particles, the outer surfaces of a first layer 2 and a second layer 3 are absent or substantially absent of any ferromagnetic particles.

The printable surfaces of the polymer print media are provided by the outermost surfaces of the co-extruded polymer print film that are absent or substantially absent of ferromagnetic material. FIG. 1 depicts a three layered polymer film prepared by a co-extrusion process wherein a core layer 1 comprises ferromagnetic particles, a first layer 2 and a second layer 3 sandwiching the core layer 1 in between.

The outer surfaces of the first layer 2 and the second layer 3 are absent or substantially absent of any ferromagnetic particles and suitable to accept printing. To improve printability, the polymer film can be subject to corona treated, or undergone print coating or other treatment to the film's printable surface(s). The first and second layers 2,3 are made of flexible material such as plastic so that the finally formed film product may be rolled up into a roll and be cut with conventional woodworking tools, scissors, and knives. The flexible material is, preferably, able to stand the high temperature and pressure of an extrusion process without degradation. Suitable polymers for forming the first or second layers 2,3 include those having the melting points between 400° F. and 600° F. In some embodiments, the polymer may be selected from the group consisting of polyolefin, polyester, polypropylene, and blends thereof.

Print receptive fillers known in the art, such as titanium oxide, clay, and calcium carbonate, may be included in the formulations of the first or second layers 2,3. The fillers not only improve the printability of the outer surfaces, but also help to provide white color surfaces, which advantageously conceals the dark, black color of the magnetic receptive core. It is discovered that the addition of high loads of the fillers in the layers 2,3 can also help to compensate the temperature differences caused by the different ingredients of different layers, which turns out to be very useful during the manufacturing process. Because the high load of magnetite or other ferromagnetic media in the core layer 1 acts as a heat sink and causes a slower cooling, it is important to adjust the flow temperature between the core layer 1 and the first and second layers 2,3 so that the three layers can be cooled at substantially the same rate and be able to retain the three-layer configurations in the solidified film. The fillers can take up, preferably but are not limited to, about 20% to about 30% by weight of the first or second layer 2,3. The particle size of the fillers may be between about 0.02 µm to about 50 µm.

The thicknesses of the core layer 1, the first layer 2 and the second layer 3 may vary depending upon the particular use of the print film. In some embodiments, the thickness of the core layer 1 is about 6 mils to about 12 mils, the thickness of the first outer or second layer 2,3 is about 1.5 mils to about 5 mils. An advantageous feature of the present invention is that all layers can be fused together by the heat created in the coextrusion process. Bonding layers or adhesives are not required between the layers but can be optionally used for some embodiments.

Figure 3:
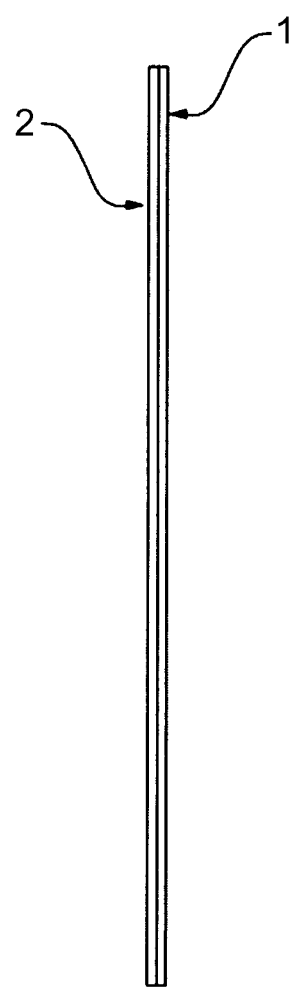
FIG. 3 depicts a two-layered co-extruded polymer film wherein a core layer 1 comprises ferromagnetic particles, the outer surface of a first layer 2 is absent or substantially absent of any ferromagnetic particles.

FIG. 3 depicts a co-extruded polymer film wherein only one side of core layer 1 is adhered to a first layer 2, as such it represents a magnetic receptive film with a one-sided printed surface. The components of the magnetic receptive core layer 1 can be the same as that of the core layer 1 of FIG. 1, and the components of the first layer 2 can be the same as that of the first layer 2 of FIG. 1. The film in FIG. 3 can be made by the same extrusion process as that in FIG. 1 except that here only two layers of extrudates are fused together to form a solid film.

The invention also encompasses an embodiment wherein at least one layer exists between the first layer 2 and the core layer 1. This embodiment represents a set of one or more layers, rather than a single layer, adjacent to one side of the core layer 1. Each layer of the set of layers is placed one on top of the other and the set of the layers has an innermost surface and an outermost surface. The innermost surface of the set is fused with one side of the core layer 1 and the outermost surface of the set is absent or substantially absent of ferromagnetic material and suitable to accept printing. The innermost layer may be made of the same components as that of the first layer of FIG. 1. Each layer of the set of layers may be made of a different polymer and may have different compositions. For example, some layers may contain magnetic particles for enhanced magnetic properties, and some layers may contain a sealant, a binding agent, or other inorganic filler to impart other enhanced properties. This embodiment can be prepared by a co-extrusion process.

A further embodiment of the invention is a co-extruded multilayered film comprising a magnetic receptive core layer 1 suitable to adhere to magnets and two sets of layers residing on each side of the core layer 1, instead of one set of the layers as compared to the previous embodiment. This embodiment provides a multilayered polymer film of two-sided printable surfaces while maintaining the magnetic receptive properties and possessing other desirable properties through a co-extrusion process.

The printable surfaces of the present invention can be subject to corona treatment, print coating or other treatment to improve the bonding with printing inks. The multilayered polymer print film of the present invention can be subject to stepwise orientation in mono-axial or biaxial directions by methods known in the art to make the film thinner, more stable, and less likely to tear. The print media of the present invention further comprises graphics printed on the outer surface(s) of the multilayered polymer films by a printer.

The process for preparing the single layered extruded polymer film as depicted in FIG. 2 comprises the steps of preparing a blend of polymer resins and ferromagnetic particles by mechanically mixing, heating the blend in an extruder to a temperature sufficient to melt the blend, extruding the molten blend through a die head and the extrudate is taken up onto a chill roller, and cooling the extrudate on the chill roller to form a film.

The multilayered polymer print films of the present invention can all be prepared by using a conventional co-extruder which co-extrudes two or more feedstock out of a single die head to form a film of multiple layers of extrudates onto a chill roll. The high temperature generated during the co-extrusion causes the layers of extrudates to melt together to create one solid film on the chill roll.

Using the three-layered print film in FIG. 1 as an example, the manufacturing process comprises the steps of:

(1) blending feedstock for a first layer, wherein the feedstock for the first layer comprising a first polymer resin and a first filler, wherein the first filler is about 20% to about 30% by weight of the feedstock for the first layer;

(2) blending feedstock for a second layer, wherein the feedstock for the first layer comprising a second polymer resin and a second filler, wherein the second filler is about 20% to about 30% by weight of the feedstock for the second layer, wherein said first and second polymer resins are independently selected from a group consisting of polyolefin resin, polypropylene resin, polyester resin, and blends thereof, wherein said first and second fillers are independently selected from a group consisting of titanium oxide, clay, calcium carbonate, and combination thereof;

(3) blending feedstock for a core layer, wherein the feedstock for the core layer comprising ferromagnetic particles, such as iron or magnetite, and a third polymer resin, such as polyolefin resin, polypropylene resin, or blends thereof, wherein the ferromagnetic particles are about 15% to about 70%, preferably about 30% to about 60%, by weight the feedstock for the core layer, wherein the size of ferromagnetic particles may be about 0.02 µm to about 44 µm;

(4) transferring the blended feedstock for the first layer, core layer and second layer into three different slots of a co-extruder;

(5) heating the co-extruder to a temperature sufficient to melt all the blended feedstock;

(6) coextruding the molten blended feedstock from each slot through a single die head to provide a multilayered film having the first layer, the core layer, and second layers, wherein the core layer is disposed in between the first and second layers, wherein the outer surfaces of the first and second layers are absent or substantially absent of ferromagnetic particles and suitable to accept printing; and (7) cooling the multilayered film on a chill roller.

The above process advantageously allows the layers of the films to be fused to each other by the heat of the co-extrusion without the need of using bonding layers or adhesives.

During the process, it is important to adjust the flow temperature between the core layer and the layers in contact with the core layer because the high load of magnetite or other ferromagnetic media in the core layer acts as a heat sink and causes a slower cooling. Too much difference in the flow temperatures among the layers will interfere with the cooling such that it may be difficult for the film to retain the original three layer configurations. It is discovered the addition of the fillers, such as titanium oxide, clay, calcium carbonate, and combination thereof, in the range of about 20% to about 30% by weight of the first or second layer helps to compensate the flow temperature differences. The particle size of the fillers may be between about 0.02 µm to about 50 µm.

It would be obvious to those skilled in the art that to prepare a two-layered polymer print film as depicted in FIG. 3, one would only need to skip step (2) of the previously illustrated process.

The process may further comprise the step of mono-axial or biaxial orientation after the co-extrusion to make the film thinner, more stable, and less likely to tear. The mono-axial orientation is conducted by stretching the film in a longitudinal direction. The biaxial orientation is performed by stretching the film at a longitudinal direction followed by stretching at a transverse direction.

The process may additionally comprise the step of subjecting the film to corona treatment, print coating, or other commonly used printable surface treatments to improve the ability of the outer surfaces to retain printing inks. Microvoiding and cavitation techniques, as commonly used in the art, can be also used during the process to form a printable surface with reduced density and improved printability.

The present invention uses Davis Standard Extruder for the coextrusion process and Brueckner machine for the mono-axial orientation. It should be understood by those skilled in the art that the invention is not limited to the use of these equipments.

EXAMPLE 1

A mixture of polypropylene resins compounded with magnetic receptive particles (e.g. ferromagnetic particles) in a 25% load by weight formulated to be compatible with extruding films is co-extruded with a top and bottom layer sandwiching the magnetic receptive core layer in between.

In addition to the benefit of using one co-extrusion process to form a media with two-sided printable surfaces, this invention reduces waste in the industry and presents a more environmentally responsible option. Used product made in accordance with the present invention can be shipped back to the factory and master batched into the core layer, thanks to the white printable outer layers that conceal the magnetic receptive core.

Having described the invention with reference to particular embodiments, process conditions, and the like, it will be apparent to those of skill in the art that it is not intended that the invention be limited by such illustrative embodiments or process conditions, and that modifications can be made without departing from the scope or spirit of the invention, as defined by the appended claims.

What is claimed is:

1. A process for preparing a multilayered polymer print film comprising the steps of:
    providing a first polymer resin for feedstock of a first layer;
    providing a second polymer resin for feedstock of a second layer;
    blending feedstock for a core layer, wherein said feedstock for said core layer comprising ferromagnetic particles and a third polymer resin, wherein said ferromagnetic particles are about 15% to about 70% by weight of said feedstock for said core layer, wherein the inclusion of said ferromagnetic particles into said feedstock of said core layer slows cooling of the core layer compared to a layer extruded from a polymer resin feedstock without said ferromagnetic particles;
    suppressing a cooling rate of said first layer by adjusting an amount of a first filler added to said first polymer resin and blending a mixture of said first filler and said first polymer resin to prepare feedstock for said first layer so that said first layer and said core layer are cooled at substantially same rate after extrusion, wherein a total amount of said first filler used is about 20% to about 30% by weight of feedstock for said first layer;
    suppressing a cooling rate of said second layer by adjusting an amount of a second filler added to said second polymer resin and blending a mixture of said second filler and said second polymer resin to prepare feedstock for said second layer so that said second layer and said core layer are cooled at substantially same rate after extrusion, wherein a total amount of said second filler used is about 20% to about 30% by weight of feedstock for said second layer;
    transferring said blended feedstock for said first layer, said core layer, and said second layer into three different slots of a co-extruder;
    heating said co-extruder to a temperature sufficient to melt said blended feedstock for said core layer, said first and second layers;
    coextruding said molten blended feedstock from said three different slots through a single die head of said co-extruder to provide a multilayered film having said first layer, said core layer, and said second layer, wherein said core layer is disposed in between said first and second layers, wherein said outer surfaces of said first and second layers are absent or substantially absent of ferromagnetic particles and suitable to accept printing; and
    cooling said multilayered film on a chill roller, wherein said first layer, said core layer, and said second layer have substantially the same cooling rate.

2. The process of claim 1, wherein said first and second polymer resins are independently selected from a group consisting of polyolefin resin, polypropylene resin, polyester resin, and blends thereof.

3. The process of claim 1, wherein said first and second fillers are independently selected from a group consisting of titanium oxide, clay, calcium carbonate, and combination thereof.

4. The process of claim 1, wherein said third polymer resin is selected from a group consisting of polyolefin resin, polypropylene resin, and blends thereof.

5. The process of claim 1, further comprising subjecting said film to corona treatment or print coating.

6. The process of claim 1, further comprising subjecting said film to mono-axial orientation or biaxial orientation.

7. The process of claim 1, wherein no adhesive is used to bond said first, second, and/or core layers.

8. The process of claim 1, wherein said first and second polymer resins are different from each other.

* * * * *